(No Model.)

O. O. PHILLIPS.
BARBED FENCE.

No. 280,857. Patented July 10, 1883.

Witnesses
W. B. Corwin
Jno. K. Smith.

Inventor
Oliver O. Phillips
by his attys
Bakewell & Kerr

UNITED STATES PATENT OFFICE.

OLIVER O. PHILLIPS, OF ALLEGHENY, PENNSYLVANIA.

BARBED FENCE.

SPECIFICATION forming part of Letters Patent No. 280,857, dated July 10, 1883.

Application filed October 7, 1882. (No model.)

*To all whom it may concern:*

Be it known that I, OLIVER O. PHILLIPS, of Allegheny, in the county of Allegheny and State of Pennsylvania, have invented a new and useful Improvement in Barb-Fences; and I do hereby declare the following to be a full, clear, and exact description thereof.

As heretofore constructed, barb-fences have been objectionable because of the injury done to the cattle by the sharp barbs lacerating them, and this injury has been increased, owing to the fact that the wire is often so small as to be substantially invisible to the cattle, which, consequently, come against it unawares. Such prior barbs have been constructed with single sharp points projecting therefrom in any given direction, and such point will act as a thorn or spike to tear and lacerate the animal.

My invention is designed to obviate these difficulties, yet at the same to preserve all the advantages of the barb fences.

To enable others skilled in the art to make and use my invention, I will now describe it by reference to the accompanying drawings, in which—

Figure 1:
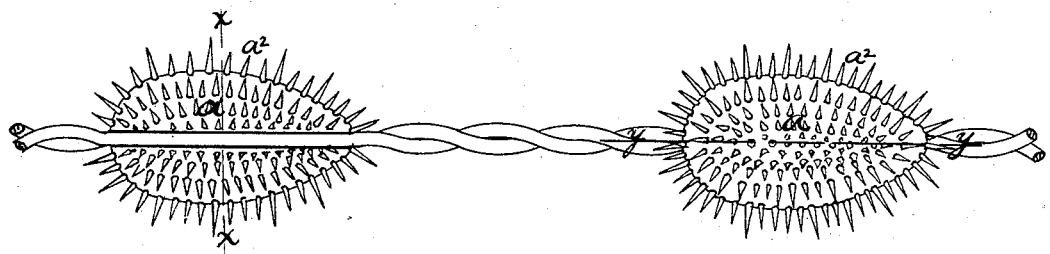
Figure 2:
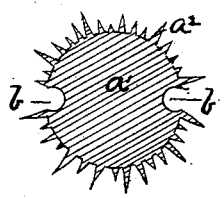
Figure 3:
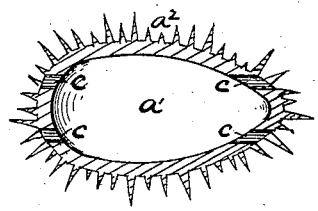

Figure 1 is a side view of the same, showing two ways of applying the spiked or barbed burrs to the wire. Figs. 2 and 3 are sections on the lines $x\ x$ and $y\ y$ of Fig. 1.

Like letters of reference indicate like parts in each.

I form a metallic burr, $a$, which consists of a solid or hollow body, $a'$, having projecting spikes or points $a^2$, said points being short and set closely together or in clusters upon the body of the burr, so that the independent points will not enter deeply the hide of the animal or tear through the same, as in case of a single point or thorn. These burrs can be formed rapidly and economically by casting in suitable molds. They can be made either with grooves $b$, extending along the sides, or with holes $c$, extending through them, and are secured on the wires by passing the latter either through the grooves $b$ or through the holes $c$. When the burrs are strung on the wire, the latter is twisted, or the twisting operation is performed at the time of stringing the burrs, so as to cause an independent twist between each burr and those adjacent thereto. The points $a^2$ are so close to each other upon the burr that they will prevent any single one from penetrating the hide of an animal coming against them to a sufficient depth to lacerate or hurt it severely. At the same time the points are sufficiently sharp to warn the animal and cause it to withdraw from contact with the fence. Another advantage consists in the fact that the burr is of considerable size as compared with the size of the ordinary barb, and is distinctly visible to the eye of the animal. As a rule, animals will avoid a barrier if perceived by them, and the visibility of the burr will cause them to avoid all contact with the fence, and thus in many instances prevent unwitting contact therewith.

In illustrating my invention I have selected the form of a thistle-burr. I do not, however, limit myself to such form. I claim a body of round or other suitable form having its surface thickly covered with points or spurs. The body may be hollow or solid, as preferred.

What I claim as my invention, and desire to secure by Letters Patent, is—

1. In a wire fence or barrier, the combination, with the fence-wire, of a series of bulbs or burrs provided with clusters of short radially-projecting points, said burrs or bulbs arranged, at intervals on the said wire, substantially as and for the purpose specified.

2. In a wire fence, the combination, with two or more twisted wires, of a burr having an oviform or spherical body thickly studded with short projecting points or thorns, substantially as and for the purpose specified.

In testimony whereof I have hereunto set my hand this 5th day of October, A. D. 1882.

OLIVER O. PHILLIPS.

Witnesses:
 W. B. CORWIN,
 T. B. KERR.